Aug. 16, 1955  A. C. PETERSON  2,715,506
AIRCRAFT WITH ROTARY AIRFOILS FOLDABLE DURING FORWARD FLIGHT
Filed July 9, 1951  4 Sheets-Sheet 1
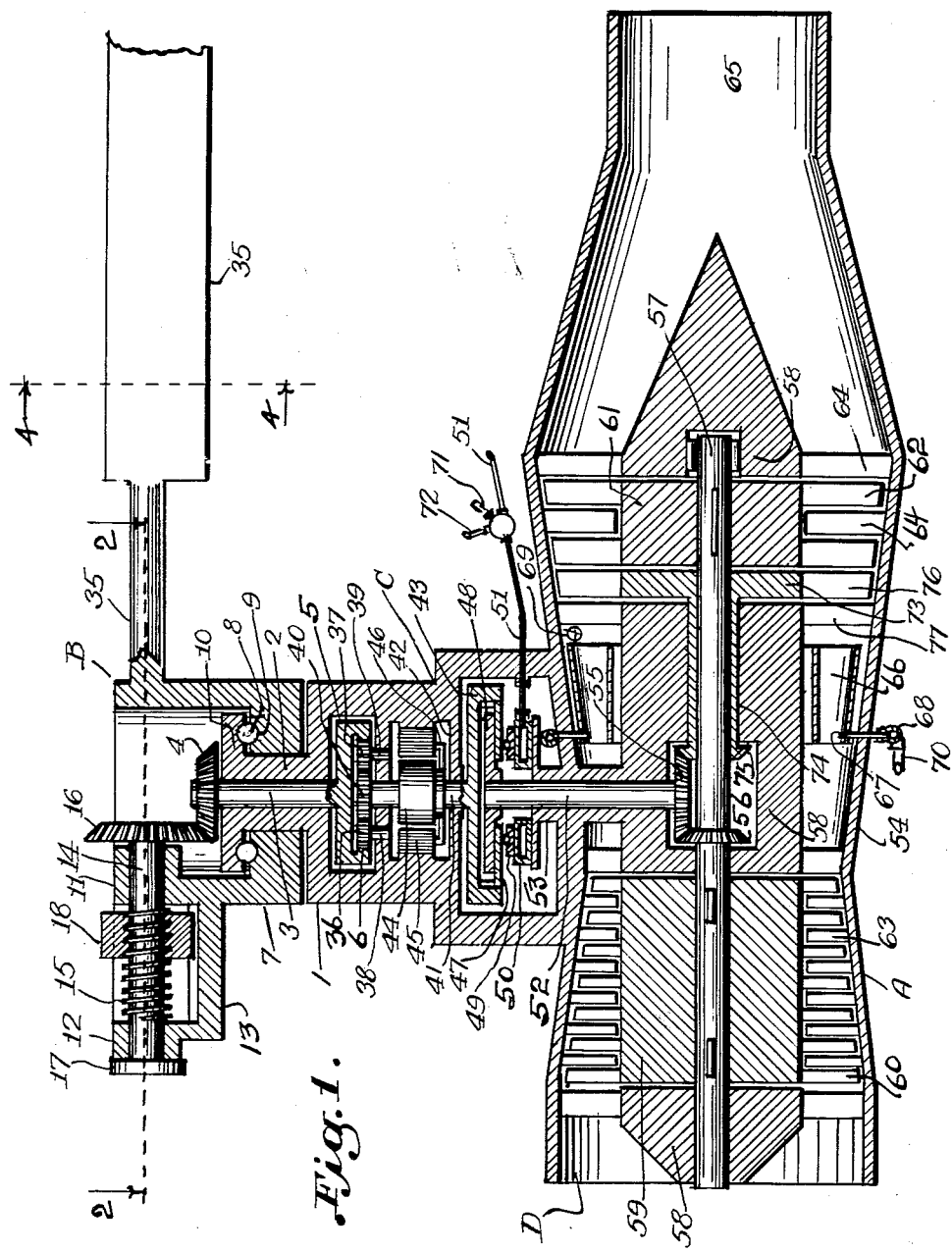
INVENTOR
Adolph C. Peterson.

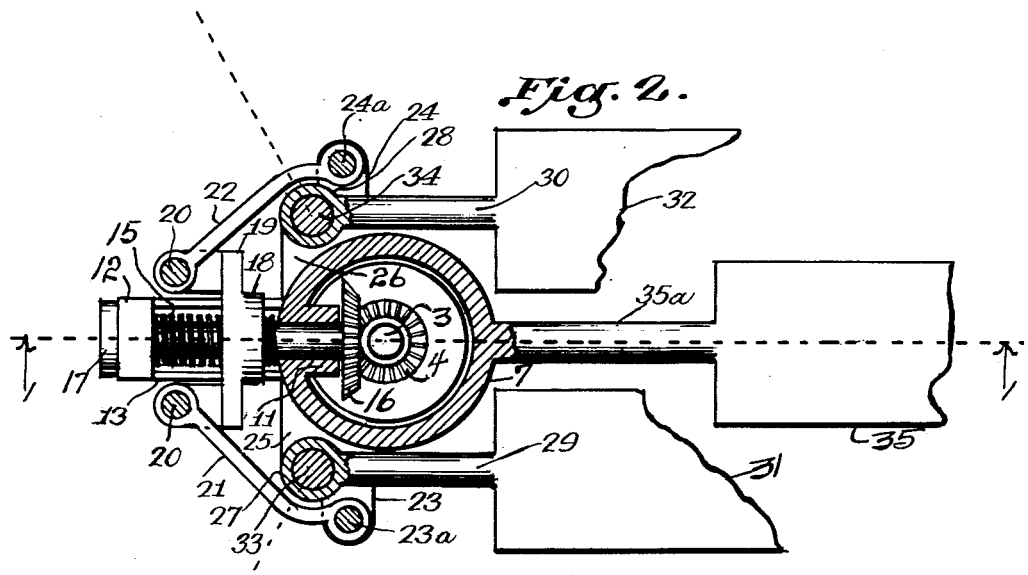
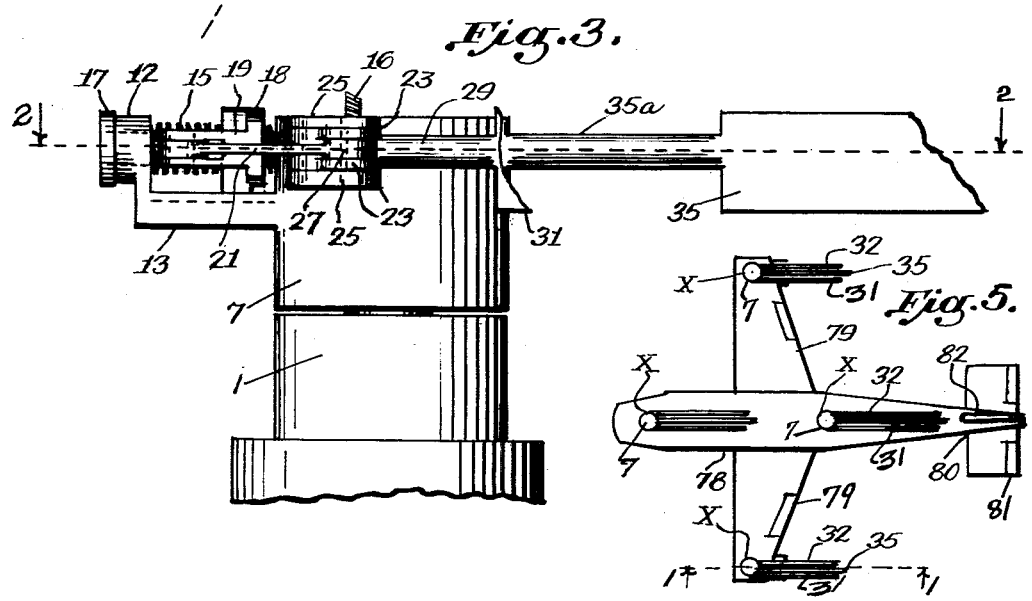
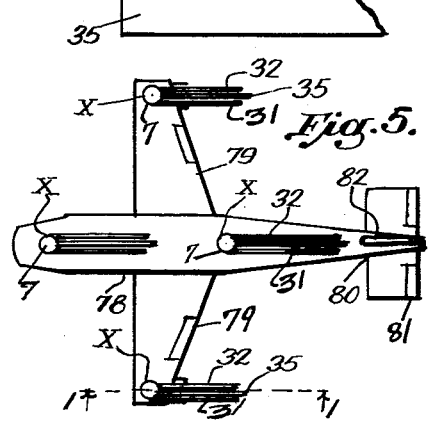
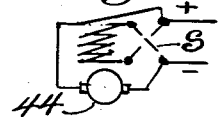
INVENTOR
Adolph Peterson.

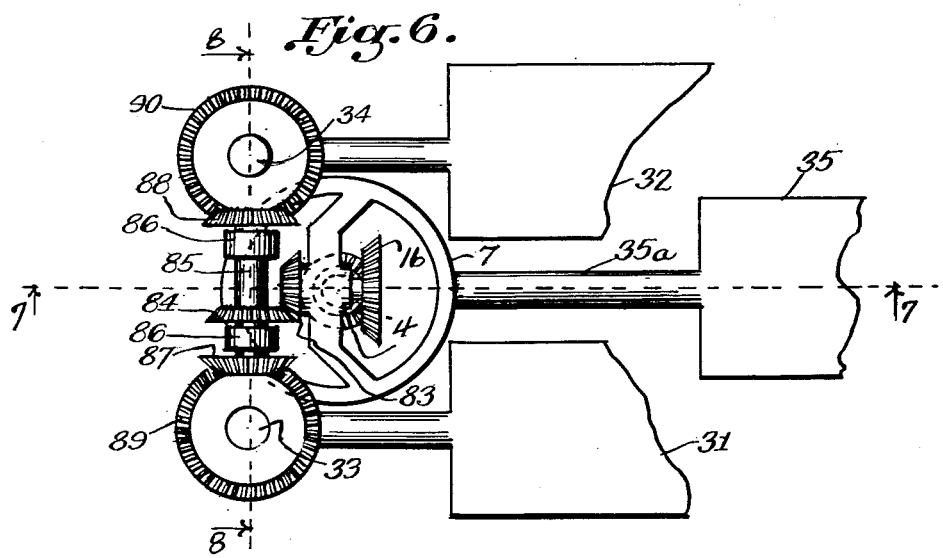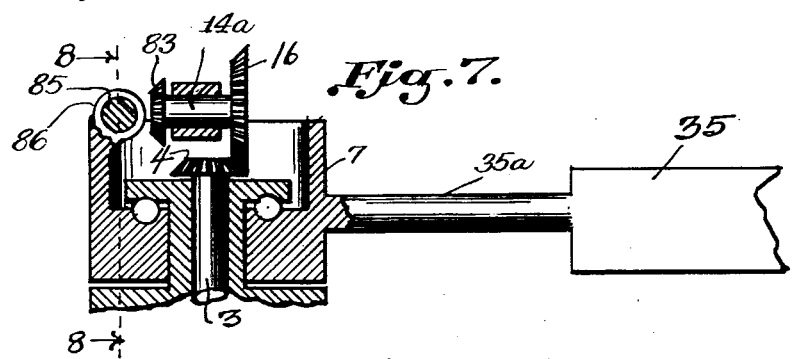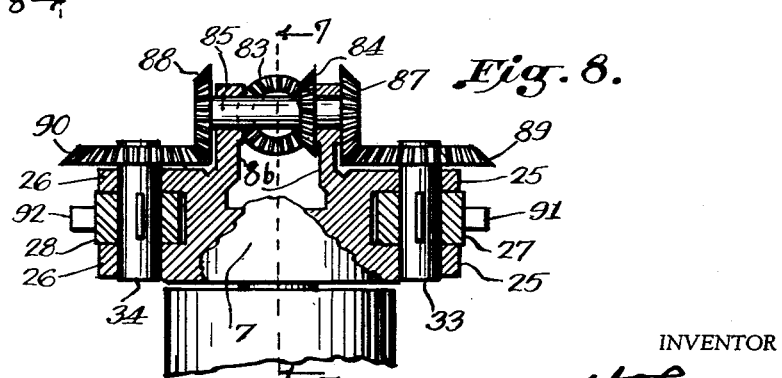

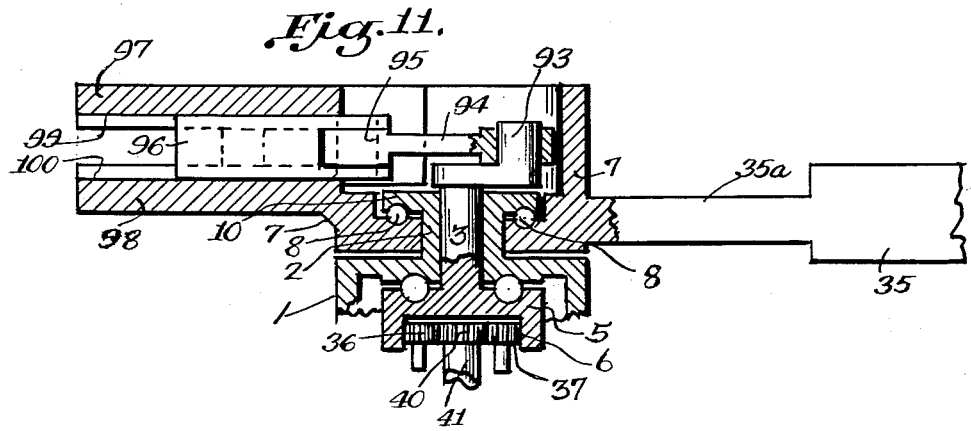
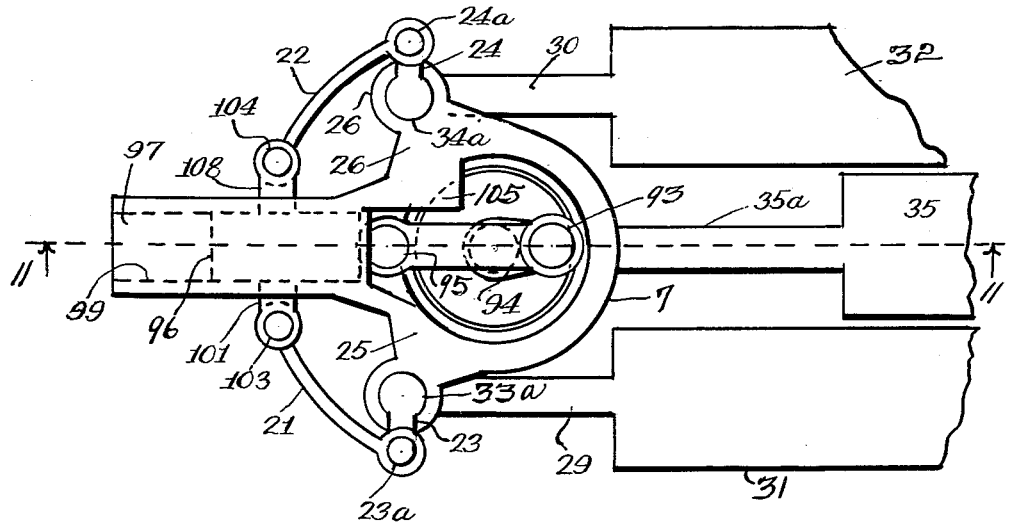

United States Patent Office 2,715,506
Patented Aug. 16, 1955

2,715,506

AIRCRAFT WITH ROTARY AIRFOILS FOLDABLE DURING FORWARD FLIGHT

Adolphe C. Peterson, Minneapolis, Minn.

Application July 9, 1951, Serial No. 235,708

9 Claims. (Cl. 244—7)

My invention relates to aircraft which is provided with means whereby it may have a normal flight as a fixed wing aircraft, and which also is provided with such means that it may in its slower travel speeds be arranged for so-called hovering travel or travel at speeds much less than the normal travel speed, and it is called Dual System Aircraft.

The chief objects of my invention are to provide an aircraft which has such ability or capacity for flight in varying condition, that it may in normal travel, travel as the usual fixed wing aircraft with high speed and with relatively little drag and accordingly with relatively high economy, and to provide also such ability or capacity for normal slow speed or even hovering flight, that it may with as great ability as the usual helicopter type of aircraft take-off from restricted aircraft fields or objects such as carrier decks, and that it may also hover over restricted size landing fields or carrier decks or building decks especially provided for such use and land with slow speed or without travel speed. An object is to provide such a means in a means that is relatively simple and capable of construction at reasonable cost and with adequate strength, and without impairment of the capacity or strength of the aircraft for ordinary translational flight. An object is to provide such a means which utilizes the facilities of the aircraft for translational travel also to effect the change of the condition of the aircraft to slow speed or hovering flight and climbing or descent without horizontal travel or high speed horizontal travel. An object is generally to improve upon aircraft so as to provide a more generally utilizable aircraft for varying flight conditions and especially in hazardous conditions.

An object is generally to provide an improved means for effecting change in a rotary sustentation means so that it may for slow speed or hovering flight be placed in the condition for rotary sustentation, and so that it may for high speed normal flight be placed in an inactive non-rotating condition so that it does not hinder high speed travel. And in this connection an object is to provide a form of utilization of the power for normal propulsion, to effect the change of the rotary sustentation means from one condition to another.

The principal devices and combinations of devices comprising my invention, are as hereinafter described, and as defined in the claims. In the accompanying drawings which illustrate my invention in several different forms, like characters refer to like parts throughout the views in so far as practicable. Referring to the drawings:

Figure 1 is a view in vertical section through the chief operating elements of one unit comprising the elements of my means for effecting the different conditions of flight, some parts being shown in full side elevation, some parts being broken away, this section being on the lines 1—1 of Figures 2 and 5.

Figure 2 is a view partly in plan view and partly in section of the unit shown in Figure 1, the section being on the lines 2—2 of Figures 1, 3.

Figure 3 is a view in full side elevation of the unit shown in Figures 1 and 2, but with the power unit broken away and air foil or blade parts broken away.

Figure 4 is a view in section transversely of one of the air foil blades of the rotary air foil unit shown in Figures 1, 2 and 3.

Figure 5 is a view in horizontal plan aspect of an aircraft embodying the application or mounting of several units of the type shown in Figures 1, 2 and 3 upon the aircraft, to illustrate one form of mounting or dispersion of such units upon an aircraft structure.

Figures 6, 7 and 8 show a modified form of my device.

Figure 6 is a plan view of the modified unit, partly illustrated as the blades are broken away, and power and propulsion unit A is not shown.

Figure 7 is a view chiefly in vertical section on the line 7—7 of Figures 6 and 8 some parts being broken away.

Figure 8 is a view chiefly in vertical section on the lines 8—8 of Figure 6 and Figure 7, some parts being broken away.

Figure 9 is an electric motor circuit diagram.

Figure 10 is a plan view of another modified form, of simpler type, some parts broken away.

Figure 11 is a section on line 11—11 of Figure 10, some parts being omitted.

Referring first to the figures from 1 to 4, both inclusive, which show in detail one unit of my system or means, this unit is here shown as the unit without its mounting on an aircraft fuselage or structure, but in its association with the power propulsion means formed with the unit and which is also the power propulsion means of the aircraft structure when mounted on the aircraft structure. The unit comprises in general the power propulsion means generally denoted A and the rotary wing structure generally denoted B, and a connecting transmission means generally denoted C. The connecting transmission means C is generally formed in and mounted in a rotary wing mounting pylon 1 which is fixed securely on or formed with or mounted on a turbine jet propulsion unit which is the power propulsion means A, that is the means C and the pylon 1 are supported above the means A, although it may be noted that the rotary wing structure and the connecting transmission means may be otherwise supported on the aircraft structure, in any means so that the general operating relation as hereinafter described is achieved.

The mounting pylon 1 has rotatable on a vertical axis in its extreme upper part 2 which forms a bearing therefor, the wing rotor driving shaft 3 which has fixed on its upper end the bevel gear 4 and has fixed on or formed with its lower end the drum 5 which latter has formed internally thereof an internal spur gear 6, which is driven as hereafter described. A wing rotor hub 7 is rotatably mounted on the pylon part 2 and has a ball or roller bearing 8 between the bearing flange 9 on its lower end and the bearing flange 10 formed as a head on or secured on the extreme upper end of pylon part 2, so that by the upward thrust of bearing flange 9 against the bearing flange 10 of pylon part 2 through the medium of ball bearing 8, the rotor hub 7 is supported and held by pylon part 2 and its bearing flange 10 against upward pull of the wing rotor means as hereafter described, in rotation of the wing rotor means.

The rotor hub 7 has formed with it so that its axis is in the vertical plane transversely of the axis of pylon 1 and shaft 3, a bearing 11 and has also formed with rotor hub 7 with its axis in the same plane another bearing 12 supported by bearing bracket 13 which is a part of the rotor hub 7, that is, formed and secured therewith. In these bearings 11 and 12 there is rotatably mounted a screw worm shaft 14 which has a worm screw 15 formed upon it, and has also fixed on or formed with it at its radially inward end the bevel gear 16 and on its radially outward end the head or flange 17 which prevents movement axially of the shaft 14 and worm screw 15. The shaft 14 in the plane described, is placed so that it is offset radially from the axial center of pylon 1, but so that its axis is in the plane mentioned, and also so that its bevel gear 16 is in permanent mesh with the bevel gear 4 on shaft 3, so that bevel gear 16 and its shaft 14 and worm screw 15 may be rotated by shaft 3 for a prescribed number of turns, as hereafter described before rotation of shaft 14 becomes blocked and the rotor hub 7 becomes engaged for driving and rotation as a unit on pylon 1, part 2.

The worm screw 15 has mounted on it a counterpart screw block 18 in such manner that as shaft 14 is turned one way or the other the screw block 18 is moved axially of the shaft 14 in the limited movement it may have between the bearings 11 and 12. The screw block 18 has formed with it the laterally extended bearing brackets 19, there being two of these, at diametrically opposite sides of the axis of shaft 14. On pivot pins 20 fixed in the bearing brackets 19, one in each, there are mounted respectively the adjacent ends of links 21 and 22, in such manner that these links form a flexible connection between the pivot pins 20 and the pivot pins 23a, 24a one formed in or fixed in each of the two bearing brackets 23, 24 each having mounted thereon one of the two straps 27 and 28 which are at and formed with adjacent ends of air foil or blade rods 29, 30, respectively, the latter having fixed with or formed with them the air foil or rotor blade members 31, 32, respectively. The two bearing brackets 25, 26 are fixed on or formed on opposite sides of the plane mentioned, which passes vertically through the axes of shafts 14 and 3. The bearing brackets 25, 26 have fixed in or formed in them the two pivot pins, vertically placed, whereon are respectively flexibly mounted the straps 27 and 28, so that the air foils or blade members 31, 32 respectively, are mounted and supported by these two vertical pivot pins, designated 33, 34, respectively, and are thereby supported by and are rotatable with rotor hub 7 as a unit with the latter in normal operation. The blade members 31, 32, are however, capable of movement about the vertical pins 33, 34 as axes, in the plane which is horizontally and transverse of the axis of rotor hub 7, and approximately in the same horizontal plane in which is the axis of shaft 14. The two bearing brackets 25, 26, and with them the pivots 33, 34, are formed with or fixed securely on the rotor hub 7, and so placed relatively to the axis of rotor hub 7, that the axes of the pivot pins 33, 34 are at locations approximately 120 degrees apart in the circle about the axis of rotor hub 7, so that when blade members 31, 32 are swung into their radially extended positions, they are substantially 120 degrees apart in that circle, and so that another fixed air foil or blade member 35, which is fixed securely on or formed with hub 7, not to swing in the said circle relatively to rotor hub 7, will, when blade members 31, 32 are in their radially extended positions, lie substantially in the radial radius of rotor hub 7, in said horizontal plane, which is at the third 120 degree radius from rotor hub 7. That is, the three blade members 35, and 31, 32 when the latter two are radially extended, occupy radii, respectively, which are each 120 degrees apart from adjacent blade members, and they are thus substantially equi-distantly separated positions radially in the circle about the axis of rotor hub 7 which is horizontal and transversely thereof.

The rotor hub 7 with its attached parts which form a unit with it may be formed in any such number of parts as will facilitate construction and as will facilitate assembly, and form a unified assembly as described, which is sufficiently strong for support of the air craft. The blade members 31, 32 are limited in their movements from their respective positions, as shown in Figure 2, by the formation of the bearing brackets 25, 26, so that when radially extended, further movement in the circle mentioned, is proscribed, and this further movement is also limited by the limited movement of the screw block 18 between the bearings of shaft 14. This limiting restriction will prevent further rotation of bevel gears 16 and 4, relatively to the rotor hub 7, so that when the blade members 31, 32 have in extension movement, reached the radially extended positions, the rotor hub 7 is then locked with bevel gear 4 and shaft 3, so that any further torque in the same direction, exerted by shaft 3, results in application of that torque to the rotation of rotor hub 7 with its blade members 31, 32, 35, as a unit, upon the pylon part 2, as a bearing.

The drum 5, by its internal spur gear 6, is in permanent engagement through the small spur gears 36, 37, which are eccentrically mounted in pylon 1 by bearings, as shown, and small shafts 38, 39, with the centrally disposed spur gear 40, and the latter is fixed on the extreme upper end of the intermediate shaft 41 which is mounted in bearings 42 in pylon 1, and the shaft 41 at its extreme lower end has formed with it or fixed on it the drum 43, which is a friction clutch drum. The intermediate shaft 41 has fixed on it the motor armature 44, which is revolvable within the motor fields 45 fixed in pylon 1, commutator brushes 46 providing for current flow.

The clutch drum 43 has a friction plate 47 by which engagement of clutch drum 43 and driving plate 48 is enabled, and the plate 47 is moved axially by means of the ball bearing member 49 which is in turn thrust upward axially by the expansible bag engager 50, whenever the latter is inflated by means of fluid under pressure from the fluid conduit 51. The driving plate 48 is fixed on the upper end of vertical shaft 52, which is rotatable on a vertical axis in bearings 53 formed in turbine casing 54. Shaft 52 at its lower end interiorly of turbine casing 54 has fixed on it, the bevel gear 55, and the latter is in permanent engagement with the bevel gear 56 which is fixed on the turbine shaft 57.

The turbine shaft 57 is mounted on a horizontal axis in bearings 58 formed in turbine casing 54 and bears fixed on it and rotatable with it, the compressor rotor 59 with its blades 60 and the turbine rotor 61 with its blades 62. The stages of compressor blades 60 rotate between stages of compressor stator blades 63 and the turbine blades 62 rotate in stages between stages of turbine stator blades 64. The turbine casing has an air intake for intake of atmospheric air, D, and which is directed forwardly of the aircraft in travel. The turbine casing has the jet exhaust 65 for exhaust of gases and propulsion of the aircraft, in horizontal travel, in the manner in which jet propulsion means usually operate. The annular combustion chamber 66 is formed between the compressor and the turbine rotor, and fuel nozzles 67 are provided for injection of fuel from the conduit 68. Any means is provided for ignition, denoted 69. The annular conduit 68 is supplied with fuel under pressure by any fuel supply conduit 70, in any manner by any fuel pumping means, as in turbines, this being not shown particularly as it is commonly known and used. The fluid conduit 51 may supply either liquid or fluid as air under pressure, and a valve 71 is interposed which may alternatively permit discharge of fluid from the engager 50 to release conduit 72 or close the latter conduit and permit fluid under pressure to flow from supply conduit 51. Any means may be used for supply of the fluid under pressure to conduit 51, such as any reservoir or pump means as is commonly available in aircraft structures.

Immediately ahead of the turbine rotor 61 in the turbine casing 54 there is a supplementary turbine rotor 73 which is fixed on and to rotate with the tubular shaft 74 which is mounted externally of turbine shaft 57 between turbine rotor 61 and compressor rotor 59. The supplementary turbine rotor 73 and tubular shaft 74 rotate in the direction opposite to the direction of rotation of turbine shaft 57 and this opposite rotation is effected by the engagement of bevel gear 75 with bevel gear 55 but on the opposite side of bevel gear 55 from that with which the bevel gear 56 is engaged. Bevel gear 75 is fixed on the end of tubular shaft 74. The supplementary turbine rotor 73 has mounted on it annularly thereof the single stage of turbine blades 76, and immediately ahead of the blades 76 in turbine casing 54 there is mounted annularly within the casing 54, the annular stage of nozzle blades 77, which form between them the nozzles, as in turbines for direction of flow of gases against the first set of turbine blades 76. The first stage of blades 62 of turbine rotor 61 are formed to procure opposite rotation to that procured by flow of gases on blades 76, as first stage 62 is immediately rearward of stage 76, and the stage 76 acts as nozzle blades or reaction blades to the first stage 62.

In an aircraft constructed with the unit which has been as above described, it is preferred that more than one of such units be mounted on the aircraft structure, although only one, in some constructions, may be used, especially in such constructions as are used or to be used for highly skilled pilots, as in air force service. Preferably, at least two or three such units, will be used, and they may be mounted in any manner on an aircraft structure, one such manner being shown in Figure 5, which shows an aircraft fuselage 78, main wings 79, empennage structure 80 having elevator ailerons 81 and vertical rudder 82. On this structure, there are shown four units such as have been above described, each generally designated X, each being shown only diagrammatically, each having all the elements as above described in connection with the description of the power, propulsion, and rotary wing structure, including the individual control valve 71, and also an individual control circuit as shown in Figure 9, for the motor 44—45, including reversing switch S, whereby each motor 44—45 may be caused to rotate in either direction.

Having as above described the construction, use or operation is briefly described in connection with such an aircraft as that shown in Figure 5, which has four of the units, fixed on it. It may be noted that the turbine casings 54 of units may be placed in any manner in the aircraft structure, either buried in the wing or fuselage structure, with the air intakes and jet exhaust open to atmosphere, but in any case, the pylon 1 will be sufficiently elevated above the immediately adjacent structure, that the rotary wing structure may adequately revolve, when the blades are in extended positions.

Assuming that the aircraft is on a small landing field or, as it may be, on a carrier deck or roof top, the pilot first starts the turbine shaft 57 in rotation by any means such as a starting motor, which is not shown but commonly used, or any ground starting means as commonly known or used, and by adjustment of the fuel supply, as commonly provided in connection with fuel supply 70, first causes idling action of the turbine shaft 57, and then by valve means 71 for each unit X, causes fluid under pressure to inflate engager 50, thereby engaging clutch plates 47—48, and drum 43. Shaft 52 now begins to transport driving torque to intermediate shaft 41 and thereby to shaft 3, bevel gears 4, 16, and to shaft 14 so that screw block 18 is thereby moved leftwardly in Fig. 1, and Figures 2, 3, and this leftward movement exerts pull on links 21, 22, to thereby simultaneously pull blades 31, 32 away from blade 35, in the circle about the axis of shaft 3, and thus blades 31, 32 are pulled into the positions 120 degrees apart from blade 35 and 120 degrees apart from each other, all blades being stationed apart in the 120 degree positions.

In this movement the torque may be sufficient to cause rotation of rotor hub 7, since there is yet no travel of the aircraft. As soon as blades 31, 32, 35 are in the 120 degree positions, that is, extended positions, the rotor is ready for take-off, and the pilot now causes each unit X to have greatly increased speed of its shaft 57, by increasing fuel supply to each set of turbine fuel nozzles 67, and thereupon the shaft 52 transmits greatly increased power and at greatly increased speed to shaft 3 and rotor hub 7, and the rotor hub 7 with blades 31, 32, 35, revolves at great speed. The rotors of all units X, will so revolve, and large lifting or climbing pull is now exerted on the aircraft and the aircraft immediately rises and immediately also starts moving forwardly in travel. Climb is continued, until the necessary climb has been completed, and when so attained, the pilot may place the aircraft in condition for high speed horizontal travel, by turning valves 71, so that fluid under pressure is cut off and pressure released from engagers 50 of all the units, and this may be done substantially simultaneously or one at a time in close succession. As engagers 50 release clutch plates 48 of the units X from shafts 41, the shafts 3 are disengaged from turbine shafts 57, and the pilot may now by switches S cause motors 44—45 of the units to give some turning movement to shafts 3 in the opposite direction to the rotating torque from shafts 57, and this will cause or permit shafts 14 to turn in the opposite direction to the previous engaging rotation, by shafts 57, and thus the blades 31, 32, will be caused by the effect of the wind stream and the slight turning movement by motors 44—45, to move into the retracted positions, as shown in Figures 2, 3, whereby the blades 31, 32 are parallel to blade 35, trailing together rearwardly in the wind slip stream from the axis of rotor hub 7.

While the motor 44—45 is shown as provided to aid in causing the retracting movement of blades 31, 32, it is contemplated that the worm screws 15 may have such inclination that retracting movements are permitted without action of motors 44—45. But motors 44—45 are preferably provided for this assisting action.

In the movement for retraction of the blades 31, 32 from the extended positions, the motor 44—45 may be used to not only give some assistance to this retraction movement, but in giving that assistance the torque of the motor or motors 44—45 in the reverse direction, will also assist in the braking of the rotor hub 7 against the normal direction of rotation of the rotor hub 7, so that the rotation is quickly retarded, and in this retardation, the wind slip stream, will quickly become effective to pull the blades 31—32, into the retracted positions parallel to the blade 35, as any movement of the blades 31—32 toward that position, immediately results in pull of the rotor blades into the trailing positions, that is trailing from the axis of hub 7.

When the pilot desires to land upon any available landing position, such as a carrier deck, or other landing place, he may first by somewhat reducing the speed of turbine shafts 57, by reduction of fuel supply, cause some reduction in travel speed of the aircraft, and he may then by turning valves 71, of the units X, either simultaneously or one at a time in close succession, cause fluid under pressure to flow from supply pipe 51 to engagers 50, the release of fluid being then also blocked by valves 71, and thereupon reengagement of shafts 52 with shafts 3 is effected and torque is applied to shafts 14 to turn them in the direction causing leftward movements of blocks 18, and the links 21, 22 and blades 31, 32 are then again pulled into the equi-distantly separated 120 degree positions. The rotor hubs 7 with their blades 31, 32, 35, in the active positions, are then rotated by the torque of the shafts 3, and the rotors contribute sustentation to the aircraft, and as this occurs, the aircraft further slows in horizontal travel, although maintaining some forward travel. Any braking means of the aircraft, such as the usual ailerons, or flaps, or other means, may be used to cause the aircraft to proceed still slower if that is desired, for landing.

Referring now to the modified form of my device, which is shown in Figures 6, 7 and 8, this form is in general similar to that of the first form described, and it has the same turbine casing 54, or unit A, and the same transmission means as C in the first form, and control means 71, and pylon 1, and shaft 3, all operating as in the first form, but in this case the rotor hub 7, has a somewhat different actuating means mounted in it, to procure the extension of the blades 31, 32, with respect to the relatively fixed blade 35. This actuating or torque imparting means for blade extension, and thereafter for driving the rotor for rotation, has the bevel gear 4 on the upper end of shaft 3, and the bevel gear 16 in engagement with bevel gear 4, but in this case the bevel gear 16 is fixed on a short horizontally placed shaft 14a which is not a worm screw shaft, but has fixed on it a small bevel gear 83 at its opposite end, and this is in engagement with a larger bevel gear 84 which is in turn fixed on a shaft 85, the latter being mounted in bearings 86 to rotate on a horizontal axis at right angles to the axis of shaft 14a. Shaft 85 has a pair of bevel gears 87, 88, fixed on its opposite ends, and these are independently in engagement with the two large bevel gears 89, 90, each with one of the latter, and one of the bevel gears 89, 90, is fixed on the upper end of one blade pivot 33 and the other on the upper end of the other blade pivot 34, the arrangement being such that when the shaft 85 is turned in either direction, it will turn the bevel gears 89, 90 in opposite directions, and thus will also turn the blades 31, 32 in opposite directions on their mounting pivots 33, 34. The blades 31, 32 are by their mounting pivots 33, 34 mounted in the brackets 25, 26, respectively, and thereby mounted on rotor hub 7, so that the blades 31, 32 may as in the first form be swung from the trailing positions, parallel to the blade 35, into the active or 120 degree radially extended positions, as in the case of the first form. The blade straps 27, 28, have abutting lugs 91, 92 fixed on them, one on each, so that these lugs will contact the fixed part of the brackets 25, 26 and thereby hubs 7, so as to prevent further movement of the blades relative to hubs 7, after the 120 degree extended positions have been attained, and as this stoppage occurs, the shafts 3 are rotatively engaged with the rotor hubs 7 and their blades, and thus torque for rotation of the rotors as lifting or sustentation rotors, is transmitted to the rotor hubs 7 and blades, for aircraft sustentation, as in the case of the first form described.

It is apparent that in this form of my device, the motor means 44—45 of the first form is not as necessary as in the first form, because the bevel gears will more readily rotate, and that the motors 44—45 may if desired be omitted from each unit X in this form of the unit. Preferably it may be included, in order to give some retarding effect upon the shaft 3 and the rotor hub, so as to cause it to more quickly be retarded and thereby permit quicker retraction of the blades 31, 32 into the trailing positions. As in passing from the extended active positions of blades of rotors, the aircraft by the power and propulsion means A of each unit, is given added speed, the wind slip stream will quickly cause such drag to be exerted upon the blades 31, 32, when they are free from torque by shafts 3, that the blades are substantially immediately forced into the retracted positions, trailing from hubs 7. Any other means for braking hubs 7 than that of the motors 44—45 may be used instead. Any other form of engine and propulsion means may be used instead of the turbine and jet tube means shown, and any form of clutching means, other than the clutch means 47, 48, 50, may be used.

Referring now to Figures 10 11, a further modified form, this form is in general similar to the other forms, described, and only parts above the shaft 41 are shown, the shaft 41 being broken away. The shaft 41 drives drum 5 through spur gears 36, 37 and internal gear 6 of drum 5, and drum 5 is fixed on shaft 3 to drive it, as in the other forms. In this form shaft 3 has, instead of bevel gear 4, a crank 93 fixed on its upper end, and this crank 93 has the wrist end of a connecting rod 94 pivotally mounted on it and the other end of connecting rod 94 is flexibly mounted by pin 95 in the near end of a slide block 96, the latter being reciprocable in a guide means formed by upper and lower blocks 97, 98 which have guide grooves 99, 100 formed in them.

The blocks 97, 98 are formed integrally with or firmly attached to rotor head 7 so that they are rotatable as a unit with rotor head 7. The opposite sides of slide block 96, in the horizontal plane, have short arms 101, 102, respectively extending laterally away through the slotted or open sides formed by means 97, 98, and the outer ends of these arms have pivot pins 103, 104 fixed in them and the adjacent ends of connecting links 21, 22, respectively, flexibly mounted on the pins. The opposite ends of the links are flexibly mounted on pins 23a, 24a, respectively, which by the arms 23, 24, respectively, are secured to the air-foil arms 29, 30, respectively, by means of the pivot pins 33a, 34a, each arm 23 or 24 thus being capable of swinging the attached arms 29 and 30 and their attached air foils or blades 31, 32, as the pins 33a and 34a are in this case firmly attached to the pivot ends of arms 29, 30. The pins 33a and 34a are pivotally mounted on vertical axes in the bearing brackets 25, 26, respectively, and the latter are firmly fixed on rotor hub 7. The blade 35 is firmly fixed by arm 35a to hub 7, and the blade 35 of the other forms is also similarly fixed to hub 7.

In this form when torque is exerted by shaft 41 through the reduction gears 40, 36, 37, on shaft 3 this torque is imparted to crank 93 and thereby to crank rod 94 which torque thrusts slide block 96 leftwardly in the figures, and this movement causes pull to be exerted on pins 23a and 24a by links 21, 22, and crank arms 23, 24, thus drawing arms 29, 30, and attached blades 31, 32 into the radially extended, equi-distantly separated positions, so that they are thus placed in the active positions as in the other forms, described. When this torque thus causes crank 93 to move about 180 degrees from the position shown, the crank 93 with wrist end of rod 94 on it, contacts stop-block 105 which is fixed on hub 7, and thus the blades 31, 32 are held in the extended positions, and the hub 7 is firmly engaged by crank 93 and shaft 3, so that rotation of shaft 3 is imparted to hub 7, and rotates it with blades 31, 32 and 35 as a unit. To secure the opposite condition, the torque on shaft 41 is discontinued, as in the other forms, and thereupon the blades 31, 32 will automatically move toward the trailing positions shown in Figure 10, and this movement may be assisted, as in the other forms, by motor 44—45, although that assistance is not necessarily required. Braking may be applied through motor 44—45 to procure quick change to the trailing condition.

It should be noted that the aircraft on which my device is used, will have any means such as customarily used in aircraft to procure sustentation and propulsion, when the rotor air foil units, which are herein described, are inactive, that is so that their blades are in the trailing positions, and disconnected from the motor driving means.

While I have shown particular detailed devices in the description of my invention, I contemplate that other detailed devices and combinations of devices, may be used, in the realization of my invention, without departing from the spirit and scope thereof.

What I claim is:

1. A rotary air foil means for vertical sustentation of aircraft, the said means having an axis of rotation substantially vertically stationed in an aircraft, the said means including; a pylon bearing fixed on the aircraft, a multiple number of air foil blades and a hub therefor the said hub having a rotatable mounting on said pylon bearing for rotation thereon and the said blades having roots secured to said hub, a pair of said blades having a pivotable mounting at their root ends on pivots in said hub to permit extending in the same direction from the hub into positions parallel and such that all blades trail from the hub or permitting extension of said blades into positions such that all blades are separated equi-distantly and extended in a plane substantially perpendicular to the said axis of rotation, a means including a rotatable drive shaft and intermediate torque applying elements carried in bearing means formed in said hub to have movement in said last named bearing means, the said torque applying elements inter-connected between said rotatable drive shaft and the pivoted blades and by which rotational driving torque is exerted on said hub and through which torque is exerted by inter-action with said hub to extend said blades into said equi-distantly separated relation, and a power driving element inter-connected through said rotatable drive shaft with said hub and blades to move said blades to said equal extension in said transverse plane under torque applied by said power driving element, and after such extension to engage said hub to rotate said blades.

2. A sustentation means for aircraft including; a power engine including means for forward propulsion of the aircraft and having a power driving element; a rotary air foil means for vertical sustentation of the aircraft and having its axis of rotation substantially at right angles to the direction of forward translation, means for transmitting drive from the said power driving means to said rotary air foil means the said last named means including means for connecting or disconnecting said drive, the said rotary air foil means including a pylon bearing fixed on the aircraft and a mounting hub rotatably mounted on the pylon bearing and blades movable relative to said hub in a plane substantially perpendicular to the axis thereof to positions such that the blades are extended in one direction from the axis relatively parallel to each other or to positions in that plane relatively equi-distantly separated radially, the said means for transmitting drive from said power driving element to said rotary air foil means including an inter-connecting actuating element carried in bearing means formed in said hub and interacting therewith and inter-connected between the pivotable blades to turn them on their pivots and a second inter-connecting actuating means between the first named inter-connecting actuating element and the said power driving element to apply torque from the power driving element to force said blades into the radially equi-distantly separated positions and to then apply torque to rotate said rotary air foil hub and blades.

3. A rotary air foil means for vertical sustentation of aircraft, the said means having an axis of rotation substantially vertically stationed in an aircraft, the said air foil means including a multiple number of air foil blades and a pylon bearing fixed to the aircraft and a hub rotatably mounted on the pylon bearing, the said blades being anchored in said hub on vertical pivots so that the said blades may be placed relatively parallel to each other in a plane substantially perpendicular to the axis or may alternatively be separated radially in the said plane substantially equally, a power driven means including a power driven element and an interconnection between said power driven element and said blades and hub including a rotative intermediate actuating element carried in bearing means formed in the hub and interacting therewith and inter-connected between the pivotable blades and a second inter-connecting actuating means between the first named rotative intermediate actuating element and the said power driven element to force said blades into the radially equi-distantly separated positions and to then apply torque to rotate said hub and blades as a unit.

4. A sustentation means for aircraft including: a power engine having means for forward propulsion of the aircraft and having a power driving transmission therefrom, the said power driving transmission having interposed therein a clutch means for connecting and disconnecting the drive and a power driving element receiving torque from the engine through said clutch means, and having braking means applicable to the said power driving element for application of braking torque; a rotary air foil means for vertical sustentation of the aircraft and having its axis of rotation substantially at right angles to the direction of forward translation, and including, a pylon bearing fixed on the aircraft, a mounting hub rotatably mounted on said pylon bearing, air foil blades having at their root ends pivots by which they are anchored to the said mounting hub to be pivotable in a plane substantially perpendicular to the axis of the said mounting hub; a means for transmitting driving torque from the said power driving element to the said mounting hub and blades, the said last named means including a rotative intermediate actuating element carried in bearing means formed in the mounting hub and inter-acting with said mounting hub, and a second interconnecting actuating means between the first named rotative intermediate actuating element and said power driving element, and a third interconnecting actuating means between the said rotative intermediate actuating element and the said blades, all said means for transmitting driving torque when engaged to be driven by the power driving element providing torque to swing the said blades on their pivots in said perpendicular plane to positions in that plane relatively equi-distantly separated; the said braking means providing retarding effect on the said mounting hub and exerting reverse torque on said means for transmitting driving torque to thereby move the blades from their radially extended positions, to positions trailing parallel to each other from the axis of said mounting hub.

5. A sustentation means for aircraft including: a power engine having means for forward propulsion of the aircraft and having a power driving transmission therefrom, the said power driving transmission having interposed therein a clutch means for connecting and disconnecting the drive and a power driving element receiving torque from the engine through said clutch means; a rotary air foil means for vertical sustentation of the aircraft and having its axis of rotation substantially at right angles to the direction of forward translation of the aircraft, and including, a pylon bearing fixed on the aircraft, a mounting hub rotatably mounted on said pylon bearing, air foil blades having at their root ends pivots by which they are anchored to the said mounting hub to be pivotable in a plane substantially perpendicular to the axis of the said mounting hub; a means for transmitting driving torque from the said power driving element to the said mounting hub and blades, the said last named means including an intermediate actuating element carried in bearing means formed in the mounting hub and movable in the mounting hub and interacting with said mounting hub, and a second interconnecting actuating means between the said first named intermediate actuating element and said power driving element, and a third interconnecting actuating means between the said intermediate actuating element and the said blades, all said means for transmitting driving torque when engaged to be driven by the power driving element providing torque to swing the said blades on their pivots in said perpendicular plane to positions in that plane relatively equi-distantly separated; the said mounting hub having means limiting movement of said means for transmitting driving torque to provide engagement through said means between said power driving element and said mounting hub to engage said mounting hub and its blades with said power driving element to be driven rotatively thereby as a unit.

6. In an aircraft, an aircraft structure having a main wing structure non-rotatable and fixed relatively to the aircraft structure for sustentation in normal translational flight; a pylon bearing fixed on the aircraft structure; a rotary air foil means including, a mounting hub rotatably mounted on said pylon bearing, a multiple number of air foil blades anchored to said mounting hub by pivots on which the blades are oscillatable in a plane transversely of the axis of the mounting hub and relatively to the mounting hub, a means for transmitting driving torque to the mounting hub and blades, the last named means including a rotatable drive shaft rotatable on an axis co-axial with the axis of the mounting hub, a rotative intermediate actuating element carried in bearings formed in the mounting hub and rotatable in said bearings in the mounting hub and interacting with said mounting hub by its mounting therein, a second interconnecting actuating means between the rotative intermediate actuating element and the said rotatable drive shaft, and a third interconnecting actuating means between the said rotative intermediate actuating element and the said air foil blades to transmit torque to swing said blades on their pivots in said mounting hub; a power engine having means for forward translational propulsion of the aircraft, an engageable or disengageable transmission between said power engine and said rotatable drive shaft; all the said means to transmit driving torque to the said mounting hub and blades providing torque, when said engageable or disengageable transmission is engaged, to swing said blades on their pivots in said transverse plane to positions in that plane equi-distantly separated, and providing, when said engageable or disengageable transmission is disengaged, for release of the driving torque and movement of the blades on their said pivots to positions parallel and trailing from said axis; the said mounting hub having means limiting the actuation of the means for transmitting driving torque to the mounting hub and blades to effect driving torque by said rotatable drive shaft on said mounting hub and blades for rotation thereof as a unit on said pylon bearing.

7. All of the means as described and as claimed in claim 6, and in combination; an auxiliary means to apply rotative torque in the reverse direction to the said rotatable drive shaft when the latter is disengaged from the power engine.

8. A rotary air foil means for vertical sustentation of an aircraft, the said means having an axis of rotation substantially vertically stationed in the aircraft, the said means including: a multiple number of air foil blades and a hub means therefor, the said blades being anchored to said hub means by pivotable connection therewith so that the blades may be placed relatively parallel to each other in a plane substantially perpendicular to the said axis of rotation or may alternatively be separated radially in the said plane and substantially equi-distantly; a power driven means including a power driven element and a reduction transmission between said power driven element and said hub means and inter-connecting means between said reduction transmission and said blades to force the said blades into the equi-distantly separated positions radially in said plane and engage the hub means for rotation of the hub means and its said blades as a unit; the said reduction transmission including a worm shaft mounted in bearing means in said hub means to rotate on an axis which is radial to the axis of said hub means, a worm fixed on said worm shaft, a worm engaging block mounted on said worm and movable axially thereof, and a geared drive between said worm shaft and said power driven element; the said inter-connecting means including links from said worm engaging block to the said pivotable blades.

9. A rotary air foil means for vertical sustentation of an aircraft, the said means having an axis of rotation substantially vertically stationed in the aircraft, the said means including: a multiple number of air foil blades and a hub means therefor, the said blades having a means anchoring them pivotably to said hub means so that the said blades may be placed relatively parallel to each other in a plane substantially perpendicular to the said axis of rotation or may alternatively be separated radially in the said plane and substantially equi-distantly; a power driven means including a power driven element and a reduction transmission between the power driven element and the hub means and an interconnection between the reduction transmission and the blades to force the blades into said separated positions radially in said plane and engage the hub means for rotation of the hub means and its said blades as a unit; the said reduction transmission including a worm shaft mounted in bearing means in said hub means to rotate on an axis which is radial to the axis of said hub means, a worm fixed on said worm shaft, a worm engaging block mounted on said worm and movable axially thereof, and a bevel gear on said power driven element and a bevel gear fixed on said worm shaft and in permanent engagement with said first named bevel gear; the said interconnection including links from said worm engaging block to the pivotable blades.

References Cited in the file of this patent
UNITED STATES PATENTS

| | | |
|---|---|---|
| 1,789,254 | Perrin | Jan. 13, 1931 |
| 2,008,843 | Smith | July 23, 1935 |
| 2,385,464 | Peterson | Sept. 25, 1945 |